United States Patent [19]

Ghilardi et al.

[11] Patent Number: 4,588,328

[45] Date of Patent: May 13, 1986

[54] MOVABLE JOINT DEVICE FOR COUPLING A COLUMN, TOWER OR PLATFORM

[75] Inventors: Jean-Pierre R. F. Ghilardi, Bouffemont; René F. Forget, Breval; Samuel Tuson, Mesnil-le-Roi, all of France

[73] Assignee: Entreprise d'Equipements et Hydrauliques (E.M.H), France

[21] Appl. No.: 521,598

[22] Filed: Aug. 9, 1983

[30] Foreign Application Priority Data

Aug. 17, 1982 [FR] France ............... 82 14216

[51] Int. Cl.$^4$ ............................................. E02B 17/02
[52] U.S. Cl. ....................................... 405/202; 403/53; 403/163
[58] Field of Search ............... 405/195, 202, 205, 206, 405/207, 224; 403/53, 122, 133, 150, 161, 163

[56] References Cited

U.S. PATENT DOCUMENTS 1,686,695 10/1928 Heon .
3,735,597 5/1973 Guy ..................... 405/202
4,470,723 9/1984 Michel et al. ............ 405/202

FOREIGN PATENT DOCUMENTS 1322001 2/1963 France .
2359248 2/1978 France .
2369456 5/1978 France .
2405421 5/1979 France .
2002048 2/1978 United Kingdom ............... 405/206

Primary Examiner—David H. Corbin
Attorney, Agent, or Firm—Steinberg & Raskin

[57] ABSTRACT

A movable joint device for coupling a column to a base resting on the sea bed and comprising a male member and a female member each including associated assembling means allowing the joint to be obtained by assembling both members in fitting relationship with positive unilateral connection, the said members being maintained in the assembled position by means for ballasting the column to ensure a constantly downwardly directed load, whereas the said members are disassembled by merely modifying the ballasting means so as to reverse the load and impart it in an upward direction.

8 Claims, 12 Drawing Figures

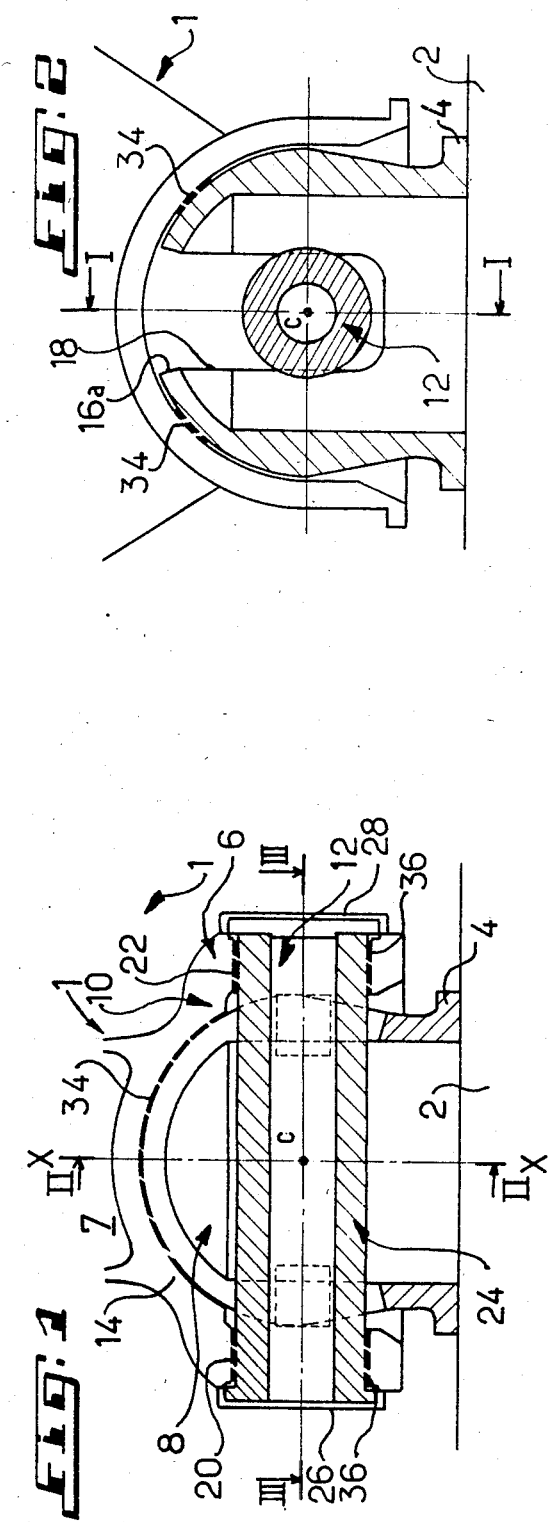
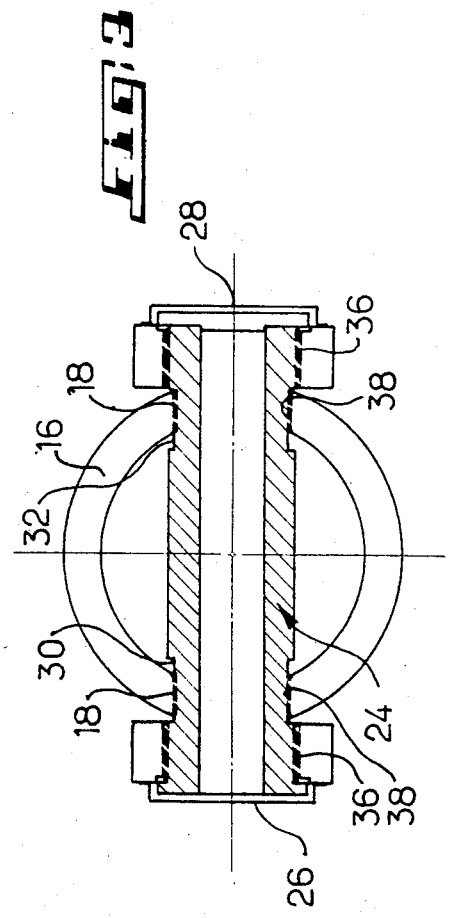

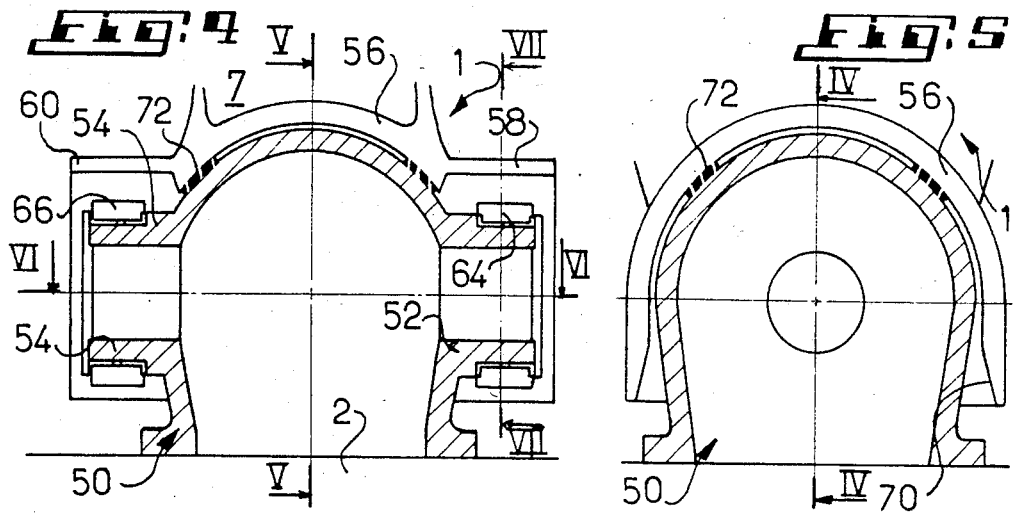
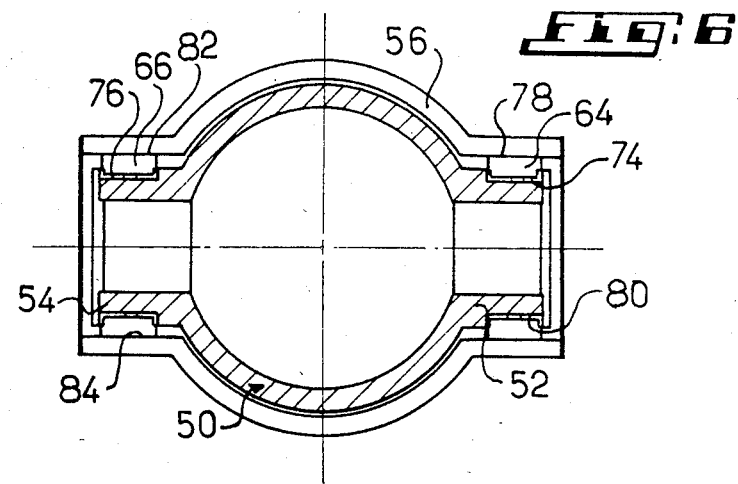
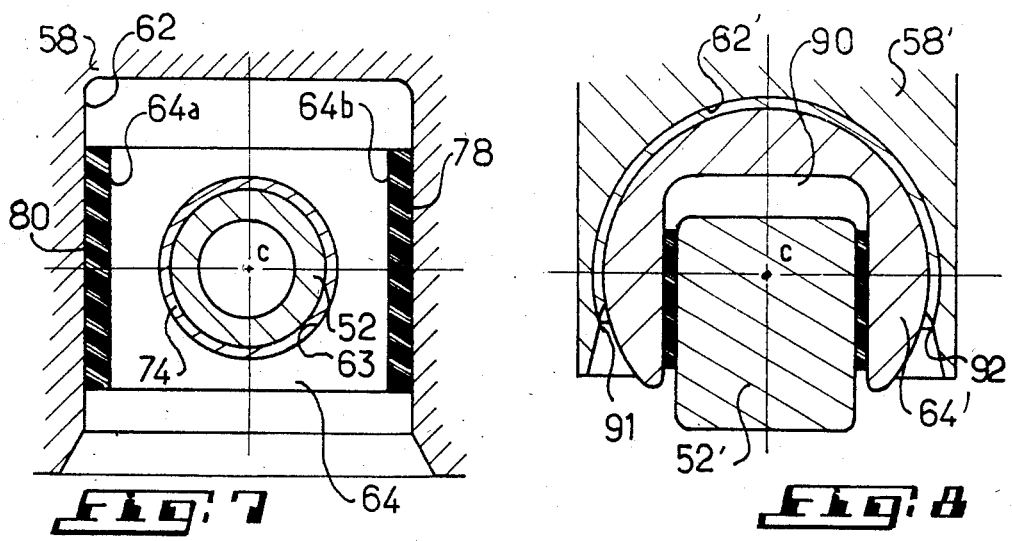

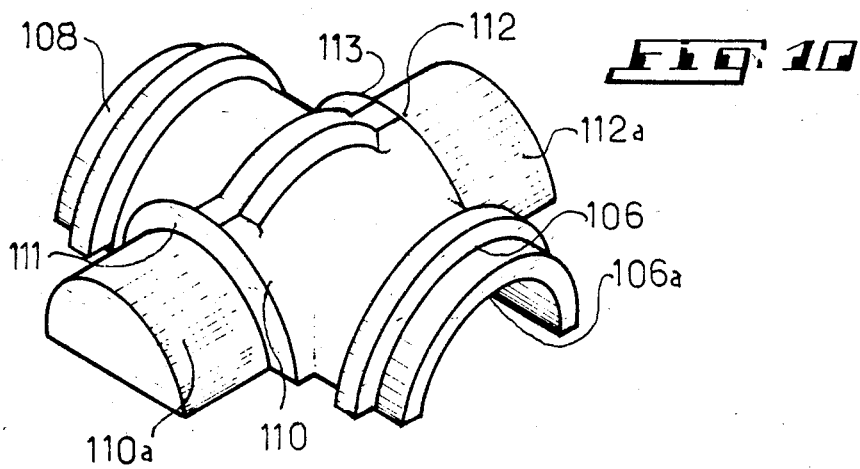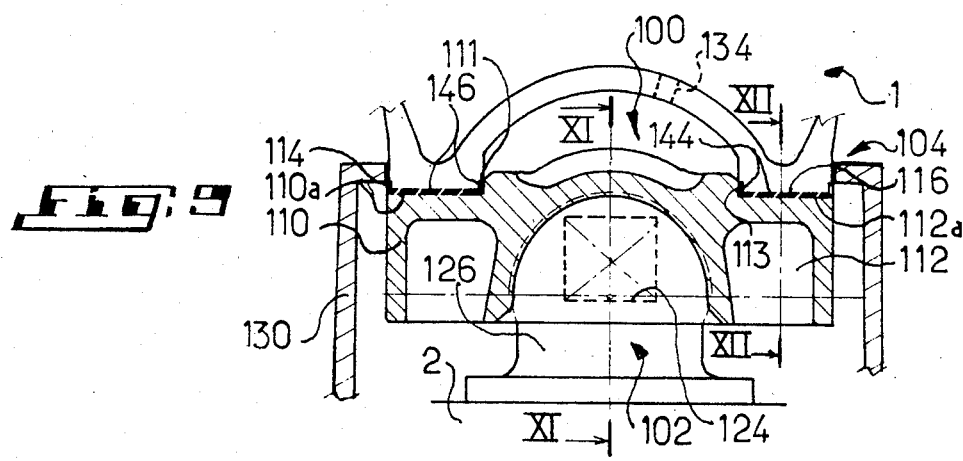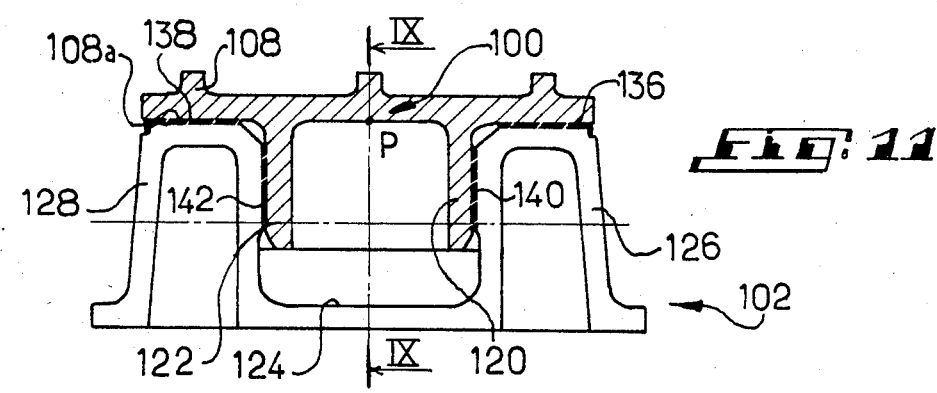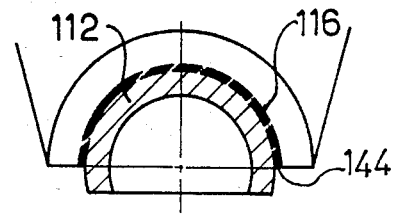

4,588,328

MOVABLE JOINT DEVICE FOR COUPLING A COLUMN, TOWER OR PLATFORM

BACKGROUND OF THE INVENTION

The present invention relates essentially to a movable joint device for coupling a column, tower or platform, e.g. for the exploitation of marine bottom resources, relative to a base resting on the sea bed.

There are already known various joint devices for movably coupling a column, tower or platform, e.g. for the exploitation of the marine bottom, relative to a base resting on the sea bed.

Such devices are generally constituted by a Cardan coupling forming a simple universal joint with positive bilateral connection which, in normal use, is constantly subjected mainly to an upward tractive force or a downward compressive force, depending on the circumstances (Archimedean hydrostatic thrust, ballasting, etc.,).

Such a Cardan joint allows the column to freely swivel in all directions under the action of the external forces applied, while at the same time preventing its rotation around its own medial longitudinal axis.

However, all the known devices, in order to be connectable or disconnectable at the site, have the disadvantage of requiring the use of a removable or reversible controlled locking system, for example a hydraulic system, in order, more particularly, to make or break in particular the bilateral connection, which, in the locking position, must take the loads exerted on the whole of the joint, thus resulting in a mechanical complexity of structure which is the greater the higher the loads, and which is therefore bulky and cumbersome.

SUMMARY OF THE INVENTION

The present invention therefore has as a purpose to remove the aforementioned drawback by providing a joint which is particularly easy to assemble without requiring the use of a locking system and the mechanical structure of which also is simple.

This problem is solved, according to the present invention, by means of a movable joint device for coupling a column, tower or platform, e.g. for the exploitation of marine bottom resources, relative to a base resting on the sea bed, characterized in that it comprises a male member secured to the base or to the column and a female member secured to the column or the base, respectively, each member comprising associated assembling means allowing the joint to be obtained by assembling the two members in fitting relationship with unilateral connection, the said male and female members being maintained in assembled position by an appropriate ballasting of the column ensuring a constantly downwardly directed load whereas the said members are disassembled by simply modifying the ballasting so as to reverse the load and impart it in an upward direction.

Advantageously, this device comprises anti-rotation means for the male and female members relative to one another around the medial longitudinal axis of the column.

According to one form of embodiment of the assembling means, the female member comprises a portion forming a sleeve, thus forming a fluid-tight bell and is preferably secured to the column, whereas the male member comprises a portion forming a ball and is preferably secured to the base.

BRIEF DESCRIPTION OF THE DRAWINGS

Of course, various forms of embodiment of the male and female members are possible, the preferred examples of which will now be described with reference to the appended drawings and wherein:

FIG. 1 is an axial sectional view of a first form of embodiment of a movable joint device according to the present invention, upon the line I—I of FIG. 2, FIG. 2 is a sectional view upon the line II—II of FIG. 1;

FIG. 3 is a sectional view upon the line III—III of FIG. 1;

FIG. 4 is a sectional view of a second form of embodiment of a movable joint device according to the present invention, upon the line IV—IV of FIG. 5;

FIG. 5 is a sectional view upon the line V—V of FIG. 4;

FIG. 6 is a sectional view upon the line VI—VI of FIG. 4;

FIG. 7 is a sectional view upon the line VII—VII of FIG. 4;

FIG. 8 is a view similar to that of FIG. 7 illustrating a variant of embodiment;

FIG. 9 illustrates a third form of embodiment of a movable joint device according to the present invention and is a sectional view upon the line IX—IX of FIG. 11;

FIG. 10 is a perspective view of the intermediate member between the male member and the female member of the joint device;

FIG. 11 is a sectional view upon the line XI—XI of FIG. 9; and

FIG. 12 is a sectional view upon the line XII—XII of FIG. 9.

DETAILED DESCRIPTION OF THE PREFERRED EMBODIMENTS

Referring to FIGS. 1 to 3, according to a first form of embodiment, a joint device for movably coupling a column 1, tower or platform, e.g. for the exploitation of marine bottom resources, relative to a base 2 resting on the sea bed is characterized in that it comprises a male member 4 secured to the base 2 or to the column 1 and a female member 6 secured to the column 1 or to the base 2, respectively.

Each male member 4 or female member 6 comprises associated assembling means 8, 10 allowing the joint to be obtained by assembling the two members in fit-in relationship with positive unilateral connection. The male member 4 and the female member 6 are maintained in assembled position by an appropriate ballasting with ballasting means of the column ensuring a constantly downwardly directed load, whereas the said members are disassembled by simply modifying the ballasting so as to reverse the load and impart it in an upward direction.

Advantageously, this device also comrpises antirotation means 12 for the male member 4 and the female member 6 relative to one another around the medial longitudinal axis X—X of the column.

According to a preferred form of embodiment, the assembling means 10 of the female member 6 comprise a portion forming a sleeve 14, thus forming an advantageously fluid-tight bell. The said female member 6 is preferably secured to the column and may be an integral part of the column 1 as shown.

On the other hand, the assembling means 8 of the male member 4 comprise a ball portion 16 which is preferably secured to the base 2, as shown, and may also be an integral part of the base 2.

According to the specific form of embodiment illustrated in FIGS. 1 to 3, the ball 16 of the male member 4 has a substantially semi-spherical external surface as seen clearly in the drawings and is provided with a vertical slot 18 (FIG. 2) extending from its top 16a down to a point below the centre C of the semi-spherical surface and extending diametrically throughout said ball 16 which, in the example illustrated, is hollow.

The sleeve 14 of the female member 6 also has a corresponding semi-spherical internal surface and is provided in its body with two coaxial, diametrically opposite, openings 20,22 the axis of which extends through the centre C of the semi-spherical internal surface which, in the assembled position, as illustrated, of course coincides with the centre C of the semi-spherical surface of the ball 16.

Furthermore, this joint comprises an intermediate member 24, such as a shaft, which is inserted into the openings 20,22 and is removably secured therein by appropriate means. Covers 26,28 may be mounted on the female member 6 so as to sealingly close the openings 20,22.

The intermediate member 24 is designed to be inserted, in the mounted position, as illustrated, into the vertical slot 18. To this end, in the regions where it contacts the wall of the slot 18, the intermediate member 24 has two flat surfaces 30,32, since the intermediate member 24 is designed in the form of a cylindrical shaft which may be hollow as illustrated.

It is thus seen that this structure (presence of the slot 18; openings 20 and 22 in the sleeve portion 14 of the female member, and intermediate member 24) constitutes the aforementioned anti-rotation means 12 for the male and female members relative to one another around the medial longitudinal axis X—X of column 1.

To facilitate the rotation of the column, there are provided anti-friction, sliding- or rolling-contact skids or bushings 34,36,38 arranged between the respective contacting surfaces of the various members. Thus, there is provided between the contacting walls of the sleeve 14 and of the ball 16 a skid 34 in the form of a spherical region which is preferably secured on the ball 16. Likewise, skids or bushings 36 are provided in the openings 20,22 and are preferably secured to the said openings. Lastly, skids or bushings 38 are likewise provided in the flat portions 30,32 to favour a sliding contact in the slot 18 and are preferably secured to the intermediate member 24. This contact may be either a sliding or a rolling contact, use being made, in the latter case, of roller bearings instead of skids.

According to the second form of embodiment illustrated in FIGS. 4 to 7, the ball 50 of the male member is provided in its body with at least one extension and possibly two extensions 52,54 projecting externally and diametrically opposite, forming journals.

On the other hand, the sleeve 56 of the female member is also provided with at least one shoulder, possibly two shoulders 58,60, projecting outwardly and diametrically opposite, extending downwardly and each forming a yoke defining a slot (slot 62 shown in FIG. 7). In the assembled position of the joint as shown in FIGS. 4 to 7, each yoke 58,60 straddles each journal 52,54 of the ball 50 so that this structure forms the aforementioned anti-rotation means 12 of the form of embodiment of FIGS. 1 to 3.

According to this particular form of embodiment illustrated in FIGS. 4 to 7, the journal, or each journal, is preferably substantially cylindrical in external profile as clearly seen in FIG. 7. In this case, the device according to the invention also comprises at least one, and possibly two, intermediate rings 64,66 which are mounted externally and freely rotatably on each journal 52,54 of the ball 50 and have a substantially square or rectangular external cross-sectional profile, the vertical edges of which, such as 64a,64b (FIG. 7) are located in the associated slot such as 62 (FIG. 7). It will be noted that, in this form of embodiment, the free lower edge of the sleeve portion 56 of the female member which, here, is an integral part of the column 1, is provided with a bevel 70 facilitating the assembling of the members. This arrangement may be adopted for the form of embodiment of FIGS. 1 to 3.

Lastly, it will be noted that various skids or bushings are also provided as in the form of embodiment of FIGS. 1 to 3 between the contacting wall of the various members. Thus, in addition to the sliding-contact skid in the form of a spherical region 72, advantageously secured in the sleeve 56, at least one, or or possibly two, bushings 74,76 are arranged between the journals 52,54 of the ball 50 and the rings 64,66 so as to allow the rings 64,66 to freely rotate around the journals 52,54. Likewise, skids 78,80,82,84 are provided between the vertical surfaces of the rings 64,66 and the yokes 58, 60, as seen clearly in FIG. 7.

Referring to FIG. 8 illustrating a variant of embodiment, it is seen that the journal, or each journal, 52' has a substantially square or rectangular external sectional profile. In this case, the intermediate ring interposed between the journal 52' and the associated yoke 58' is provided in its body with a slot 90 which is U-shaped in section, instead of the internal opening 63, whereas, of course, its external surface is conformed to the surface of the slot of the associated yoke. In this variant of embodiment, the slot 62' preferably has a substantially cylindrical internal wall, so that also the external profile of the ring 64' is semi-cylindrical. Furthermore, in the case considered, the lower edges 91,92 of each shoulder of the yoke are preferably located below the centre C' of the cylinder defined by the internal wall of the slot 62', so that the distance between the edges 91,92 is smaller than the diameter of the said cylinder, thus providing a simple manner of retaining the ring 64' in the slot 62'. Likewise, there are provided vertical antifriction skids between the surfaces of the journal 52' and the intermediate ring 64' and an anti-friction bushing between the ring 64' and the yoke 58'.

It can therefore be seen that both variants of this second form of embodiment offer the same advantages as the afore-described first form of embodiment illustrated in FIGS. 1 to 3.

According to the third form of embodiment illustrated in FIGS. 9 to 12, the anti-friction means of the joint device according to the present invention comprises an intermediate member 100 arranged between the male member 102 and the female member 104, which form a cross-shaped member with two pairs of arms 106,108; 110,112 arranged at right angles, respectively.

The pair of arms 106,108 of the intermediate member 100 bearing upon the male member 102 comprises a concave inner bearing surface 106a,108a which is seen clearly in FIG. 11 and defines a semi-cylindrical contact surface appearing clearly in FIG. 10, whereas the pair of arms 110,112 bearing upon the female member 104 comprise a semi-cylindrical convex outer portion 110a,112a provided with shoulders 111,113 which also are semi-cylindrical in shape and co-operate with two recesses 114,116 diametrically opposite to the semi-cylindrical internal surface as seen clearly in FIG. 12.

Furthermore, each arm 106,108 of the intermediate member 100 co-operating with the male member 102 preferably comprises a vertical wall 120,122, respectively, as seen clearly in FIG. 11, directed downwardly and extending between the free external edge of the said arm and the centre P of the intermediate member and at right angles to the contact plane between the intermediate member 100 and the male and female members 102 and 104. These downwardly directed vertical walls 120,122 are inserted into a cavity 124 provided in the body of the male member 102 which, in this case, is shaped as a fork with teeth 126,128 the profile of which is semi-cylindrical as is clearly understood in comparing FIGS. 9 and 11.

In all the forms of embodiment described, the female member 104 includes a downwardly extending, preferably cylindrical outermost wall such as 130 (FIG. 9) externally and practically completely surrounding the male member 102, thus forming an oil-holder bell. Preferably, the female member 104 or the male member 102 then comprises means 134 for introducing oil or a like lubricant into the said bell so as to expel the water therefrom and obtain a lubricating and anti-corrosion bath, the density of which is lower than that of water. Of course, in the third form of embodiment of FIGS. 9 to 12, there are also provided anti-friction skids between the contacting surfaces designated by the reference numerals 136,138,140 142,144,146.

Advantageously, the intermediate cross-shaped member 100 may be carried by the female member 104 which is preferably an integral part of the column 1 with a view to facilitating the assembling of the joint according to the invention.

Of course, the invention is by no means limited to the forms of embodiment described and illustrated and therefore comprises all means constituting technical equivalents to the means described as well as their combinations. For example, the joint device may be arranged between two column elements, one of which is connected to the base. These various members are preferably made of steel, e.g. stainless steel, or, in certain cases and if need be, of concrete.

What is claimed is:

1. A movable joint device for coupling a column, tower or platform, in particular for the exploitation of sea bottom resources, relative to a base resting on the sea bed, comprising
   a male member secured to one of the two elements consisting of the base and the column, respectively and a female member secured to the other element, each member comprising associated assembling means allowing the joint to be obtained by assembling both members in fitting relationship with positive unilateral connection, said members being maintained in the assembling position by means for ballasting the column to ensure a contantly downwardly directed load, whereas said members are disassembled by simply modifying the ballasting means so as to reverse the load and impart it in an upward direction;
   said assembling means comprising anti-rotation inter-fitting means with substantially constant operative engaging surface area for preventing rotation of the male and female members relative to one another around the longitudinal axis of the column,
   the assembling means of the female member comprising a sleeve portion, thus forming an advantageously fluid-tight bell which is secured to said column, whereas the assembling means of the male member comprise a ball portion which is secured to the base,
   the ball provided with a vertical slot extending from its top down to a point below the centre of its semi-spherical surface and extending diametrically throughout said ball;
   the sleeve provided in its body with two coaxial, diametrically opposite openings, the axis of which extends through the centre of its semi-spherical internal surface;
   an intermediate member, such as a cylindrical hollow shaft, inserted into said openings and removably secured therein, said intermediate member being so designated that, in the assembled position, it is inserted into said vertical slot so that said structure forms said anti-rotation inter-fitting means.

2. A movable joint device for coupling a column, tower or platform, in particular for the exploitation of sea bottom resources, relative to a base resting on the sea bed, comprising
   a member secured to the base and a female member secured to the column, each member comprising associated assembling means allowing the joint to be obtained by assembling both members in fitting relationship with positive unilateral connection, said members being maintained in the assembled position by means for ballasting the column to ensure a constantly downwardly directed load, whereas said members are disassembled by simply modifying the ballasting means so as to reverse the load and impart it in an upward direction;
   said assembling means of the female member comprising a sleeve portion, thus forming an advantageously fluid-tight bell,whereas the assembling means of the male member comprise a ball portion;
   said assembling means comprising anti-rotation inter-fitting means with substantially constant operative engaging surface area for preventing rotation of the male and female members relative to one another around the longitudinal axis of the column;
   the ball of the male member provided in its body with at least one externally projecting extension forming a journal,
   said sleeve provided with at least one externally projecting shoulder extending downwardly and forming a yoke defining a slot,
   said yoke being adapted, in the assembled position of the joint, to straddle said journal of the ball, said structure forming said anti-rotation means.

3. A device according to claim 2, wherein each journal is substantially cylindrical in external profile; an intermediate ring is mounted externally and freely rotatably on the journal or, and has an opening and a substantially square or rectangular external cross-sectional profile, the vertical edges of which are arranged in the associated slot.

4. A movable joint device for coupling a column, tower or platform, in particular for the exploitation of sea bottom resources, relative to a base resting on the sea bed, comprising a male member secured to the base and a female member secured to the column, each member comprising associated assembling means allowing the joint to be obtained by assembling both members in fitting relationship with positive unilateral connection, said members being maintained in the assembled position by means for ballasting the column to ensure a constantly downwardly directed load, whereas said members are disassembled by simply modifying the ballasting means so as to reverse the load and impart it in an upward direction;

said assembling means of the female member comprising a sleeve portion; thus forming an advantageously fluid-tight bell, whereas the assembling means of the male member comprise a ball portion;

said assembling means comprising anti-rotation, interfitting means with substantially constant operative engaging surface area for preventing rotation of the male and female members relative to one another around the longitudinal axis of the column;

the ball of the male member provided in its body with at least one externally projecting extension forming a journal, said sleeve provided with at least one externally projecting shoulder extending downwardly and forming a yoke defining slot, said yoke being adapted, in the assembled position of the joint, to straddle said journal of the ball, said structure forming said anti-rotation means, said journal substantially square or rectangular in external section profile;

an intermediate ring being interposed between said journal and yoke;

said intermediate ring being provided in its body with a slot which is U-shaped in a section and an external surface conformed to the surface of the slot of the associated yoke.

5. A device according to claim 4, wherein the slot of said yoke has a substantially cylindrical internal wall whereas the external wall of the intermediate ring is also substantially cylindrical; the lower edges of said yoke at the edges of the slot are located below the centre of the cylinder defined by the internal surface of the slot and their distance is smaller than the diameter of said cylinder thus defined.

6. A movable joint device for coupling a column, tower or platform, in particular for the exploitation of sea bottom resources, relative to a base resting on the sea bed, comprising a male member secured to the base and a female member secured to the column, each member comprising associated assembling means allowing the joint to be obtained by assembling both members in fitting relationship with positive unilateral connection, said members being maintained in the assembled position by means for ballasting the column to ensure a constantly downwardly directed load, whereas said members are disassembled by simply modifying the ballasting means so as to reverse the load and impart it in an upward direction;

said assembling means comprising anti-rotation, interfitting means with substantially constant operative engaging surface area for preventing rotation of the male and female members relative to one another around the longitudinal axis of the column;

the assembling means of the female member comprising a sleeve portion, thus forming an advantageously fluid-tight bell whereas the assembling means of the male member comprise a ball portion;

said anti-rotation means comprising an intermediate member arranged between the male member and the female member to form a cross-shaped member with two pairs of arms arranged perpendicularly, the pair of arms bearing upon the male member having a concave inner bearing surface defining a semi-cylindrical contact surface;

the pair of arms bearing upon the female member having a convex projecting portion defining a semi-cylindrical contact surface cooperating with two recesses provided in the body of the female member in diametrically opposite relationship and with a semi-cylindrical internal surface.

7. A movable joint device for coupling a column, tower or platform, in particular for the exploitation of sea bottom resources, relative to a base resting on the sea bed, comprising a male member secured to the base and a female member secured to the column, each member comprising associated assembling means allowing the joint to be obtained by assembling both members in fitting relationship with positive unilateral connection, said members being maintained in the assembled position by means for ballasting the column to ensure a constantly downwardly directed load, whereas said members are disassembled by simply modifying the ballasting means so as to reverse the load and impart it in an upward direction;

said assembling means comprising anti-rotation, interfitting means with substantially constant operative engaging surface area for preventing rotation of the male and female members relative to one another around the longitudinal axis of the column;

the assembling means of the female member comprising a sleeve portion, thus forming an advantageous fluid-tight bell, whereas the assembling means of the male member comprise a ball portion, said anti-rotation means comprising an intermediate member arranged between the male member and the female member to form a cross-shaped member with two pairs of arms arranged perpendicularly, the pair of arms bearing upon the male member having a concave inner bearing surface defining a semi-cylindrical contact surface;

the pair of arms bearing upon the female member having a convex projecting portion defining a semi-cylindrical contact surface cooperating with two recesses provided in the body of the female member in diametrically opposite relationship and with a semi-cylindrical internal surface, each arm of the intermediate member cooperating with the male member comprising a vertical wall directed downwardly and located between the free external edge of said arm and the centre of the intermediate member and which is perpendicular to the general contact plane between the intermediate member and the male member and the female member;

said vertical wall directed downwardly being inserted into a cavity provided in the body of the male member so that the latter is in the shape of a fork with teeth with a semi-cylindrical profile.

8. A movable joint device for coupling a column, tower or platform, in particular for the exploitation of sea bottom resources, relative to a base resting on the sea bed, comprising a male member secured to the base and a female member secured to the column, each member comprising associated assembling means allowing the joint to be obtained by assembling both members in fitting relationship with positive unilateral connection, said member being maintained in the assembled position by means for ballasting the column to ensure a constantly downwardly directed load, whereas said members are disassembled by simply modifying the ballasting means so as to reverse the load and impart it in an upward direction;

said assembling means of the female member comprising a sleeve portion, thus forming an advantageously fluid-tight bell, whereas the assembling means of the male member comprise a ball portion;

said assembling means comprising anti-rotation, interfitting means with substantially constant operative engaging surface area for preventing rotation of the male and female members relative to one another around the longitudinal axis of the column;

the ball of the male member provided in its body with two externally projecting, diametrically opposite extensions forming journals, said sleeve provided with two externally projecting and diametrically opposite shoulders extending downwardly and each forming a yoke defining a slot, each yoke being adapted, in the assembled position of the joint, to straddle a respective journal of the ball, said structure forming said anti-rotation means.

* * * * *